(12) United States Patent
Yoshida

(10) Patent No.: US 11,538,497 B2
(45) Date of Patent: Dec. 27, 2022

(54) INFORMATION PROCESSING APPARATUS AND INFORMATION PROCESSING METHOD

(71) Applicant: FUJITSU LIMITED, Kawasaki (JP)

(72) Inventor: Taketoshi Yoshida, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/461,321

(22) Filed: Aug. 30, 2021

(65) Prior Publication Data

US 2022/0148620 A1   May 12, 2022

(30) Foreign Application Priority Data

Nov. 12, 2020   (JP) .............................. JP2020-188880

(51) Int. Cl.
*G11B 15/093*   (2006.01)
*G11B 15/46*   (2006.01)
*G11B 15/44*   (2006.01)

(52) U.S. Cl.
CPC .......... *G11B 15/093* (2013.01); *G11B 15/442* (2013.01); *G11B 15/46* (2013.01); *G11B 2220/90* (2013.01)

(58) Field of Classification Search
None
See application file for complete search history.

(56) References Cited

U.S. PATENT DOCUMENTS

2011/0261480 A1   10/2011   Fujihara et al.
2016/0322073 A1   11/2016   Tsukahara et al.

FOREIGN PATENT DOCUMENTS

| JP | 2004-047048 A | 2/2004 |
| JP | 2016-212537 A | 12/2016 |
| WO | WO-96/34387 A2 | 10/1996 |
| WO | WO-2010/073776 A1 | 7/2010 |

*Primary Examiner* — Craig A. Renner
(74) *Attorney, Agent, or Firm* — ArentFox Schiff LLP

(57) ABSTRACT

An information processing apparatus includes a memory, and a processor coupled to the memory and the processor configured to obtain requests for reading objects that exist in a plurality of wraps in different running directions on a tape of a tape storage, calculate an integrated speed for each of a plurality of orders of reading the objects based on a distance between the objects and a running speed of the tape between the objects, and select, from among the plurality of orders, an order that maximizes the integrated speed.

12 Claims, 8 Drawing Sheets

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2020-188880, filed on Nov. 12, 2020, the entire contents of which are incorporated herein by reference.

FIELD

The embodiment discussed herein is related to an information processing apparatus and an information processing method.

BACKGROUND

There exists an object storage using a tape storage that stores a large number of objects of some tens of kilobytes to some hundreds megabytes for a long time.

FIG. 1 is a diagram explaining a data write process to a tape cartridge in a storage system 600 as an example of related art.

The storage system 600 includes a scheduler 6, a linear tape file system (LTFS) 7, and a tape device 8.

An application 9 issues to the scheduler 6 requests for reading objects 601. In an example denoted by a reference sign A1, the application 9 issues to the scheduler 6 requests for reading the objects 601 denoted by OBJ14, OBJ213, OBJ211.

The scheduler 6 determines a reading schedule (for example, a reading order) of the objects 601 based on a management information database (DB) 602. In an example denoted by a reference sign A2, the scheduler 6 optimizes the requests for reading and instructs the LTFS 7 to read the objects 601 in order of OBJ14, OBJ211, and OBJ213.

The LTFS 7 has a function of causing the application 9 to recognize storing of data such that the data is stored in folders for respective tape cartridges (tape cartridges #1, ..., and #n in the example illustrated in FIG. 1) included in the tape device 8.

The management information DB 602 of the scheduler 6 stores information for managing the data on the tape in the tape cartridges and managing the running direction of the tape.

In the tape, addresses are defined in a length direction (for example, a horizontal direction), and delimitations called wraps are defined in a width direction (for example, a vertical direction). The addresses are assigned with respective numbers, and the wraps are assigned with respective numbers. In an example denoted by a reference sign A3, 1 to 13 are assigned as address numbers from the leading end toward the trailing end of the tape, and 1 to 5 are assigned as wrap numbers.

A read/write head (not illustrated) of the tape device 8 is fixed. In contrast, the tape of the tape cartridge is run to allow data to be read and written. The running direction of the tape alternates depending on the wraps. In the example denoted by the reference sign A3, the running direction is defined from the leading end to the trailing end of the addresses in the wrap numbers 1, 3, and 5, and the running direction is defined from the trailing end to the leading end of the addresses in the wrap numbers 2 and 4.

When reading data, the running speed of the tape gradually increases short of the top of the data. In contrast, at the end of the data reading, the tape overruns and stops running for, for example, protecting the tape.

In intermittent reading, when the next data exists in a wrap the running direction of which is different from that of the current wrap, the running is stopped, the reading is temporarily stopped, and the running direction is changed. In the intermittent reading, when the next data is in the same wrap as the current wrap or the running direction of the next wrap is the same as that of the current wrap, the reading continues without stopping the running.

When the scheduler 6 receives from the application 9 a plurality of requests for reading data, the scheduler 6 rearranges the order of reading data, so as to execute the requests for reading data in the shortest time, based on the management information DB and then executes the requests instead of keeping the order of reading data as the order of issuing the requests for reading by the application 9.

In the example denoted by the reference sign A3, the objects 601 indicated by OBJ14, OBJ213, and OBJ211 are respectively recorded at positions of (1, 4), (2, 13), and (2, 11) on the tape when the notation of the address of a start point (marked by a black solid dot in the example denoted by the reference sign A3) of each of the objects 601 is (wrap number, address). It is assumed that the current head position is (1, 4).

In this case, when the requests for reading are generated from the application 9 in order of OBJ14, OBJ213, and OBJ211, based on the addresses of end points of the objects 601 (marked by blank triangles in the example denoted by the reference sign A3), a piece of the data having a closest start point address in two-dimensional distance is the object 601 that is the next reading target. Accordingly, as indicated by dotted lines indicated in the example denoted by the reference sign A3, the scheduler 6 rearranges the objects 601 in order of OBJ14, OBJ211, and OBJ213 to read the objects 601.

International Publication Pamphlet No. WO 2010/073776, Japanese Laid-open Patent Publication No. 2016-212537, and Japanese Laid-open Patent Publication No. 2004-047048 are disclosed as related art.

SUMMARY

According to an aspect of the embodiment, an information processing apparatus includes a memory, and a processor coupled to the memory and the processor configured to obtain requests for reading objects that exist in a plurality of wraps in different running directions on a tape of a tape storage, calculate an integrated speed for each of a plurality of orders of reading the objects based on a distance between the objects and a running speed of the tape between the objects, and select, from among the plurality of orders, an order that maximizes the integrated speed.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

Figure 1:
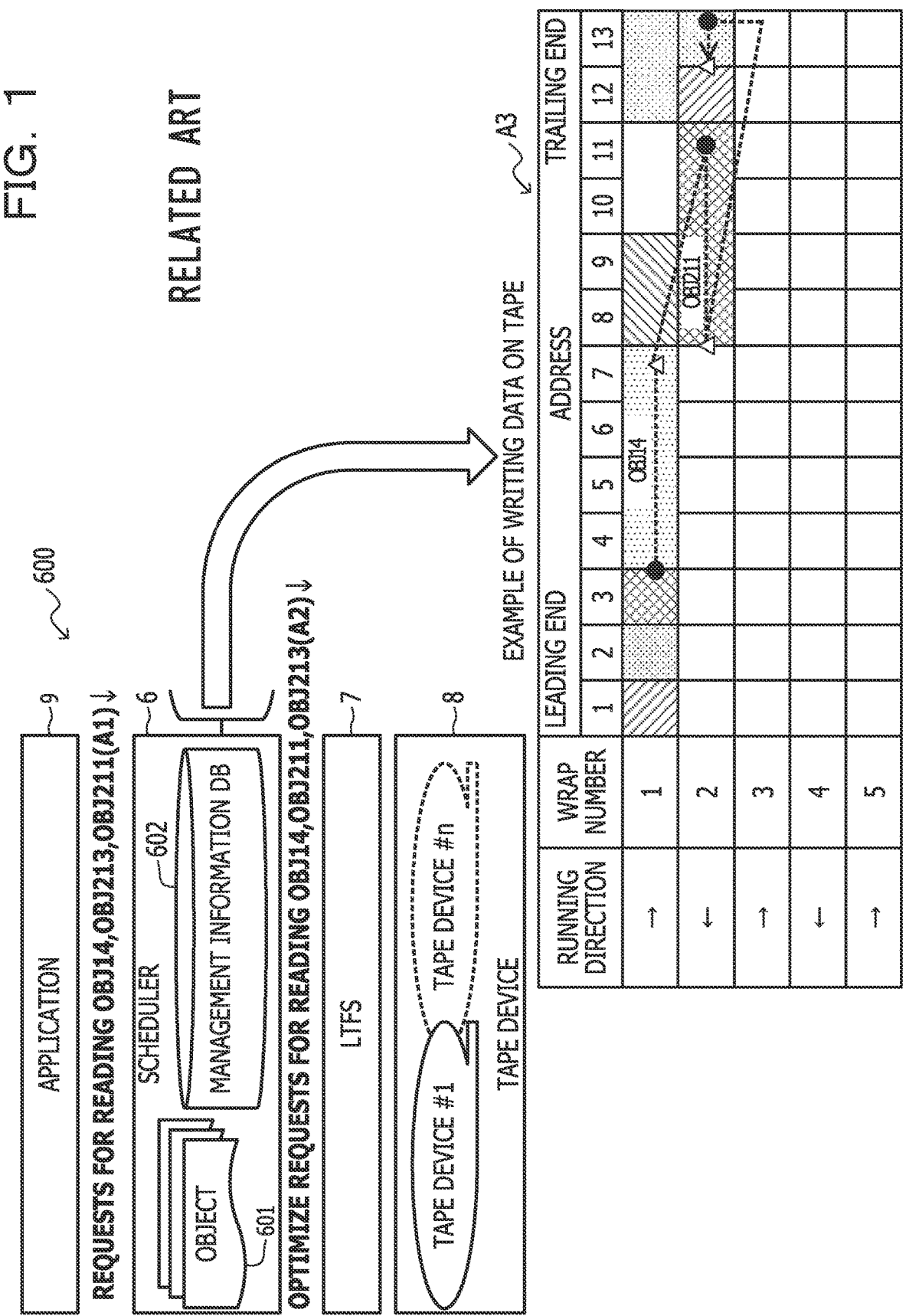
FIG. 1 is a diagram explaining a data write process to a tape cartridge in a storage system as an example of related art.

In the above-described scheduling process for the requests for reading, the order of the objects 601 is determined so as to reduce the two-dimensional distance between the end point and the start point of two of the objects 601. However, since changes in the running direction of the tape due to the difference in the order of the objects 601 are not considered and the running speed reduces when the running direction is changed, the order of the requests for reading is not necessarily determined so as to minimize reading time.

[A] Embodiment

Hereinafter, an embodiment will be described with reference to the drawings. The following embodiment is merely exemplary and is in no way intended to exclude various modification examples or technical applications that are not explicitly described in the embodiment. For example, the present embodiment may be implemented with various modifications without departing from the gist of the present embodiment. Each of the drawings is not intended to indicate that only the drawn elements are provided, and the embodiment may include other functions and so on.

The same reference signs denote the same or similar elements in the drawings, thereby the description thereof is omitted.

[A-1] Configuration Example

Figure 2:
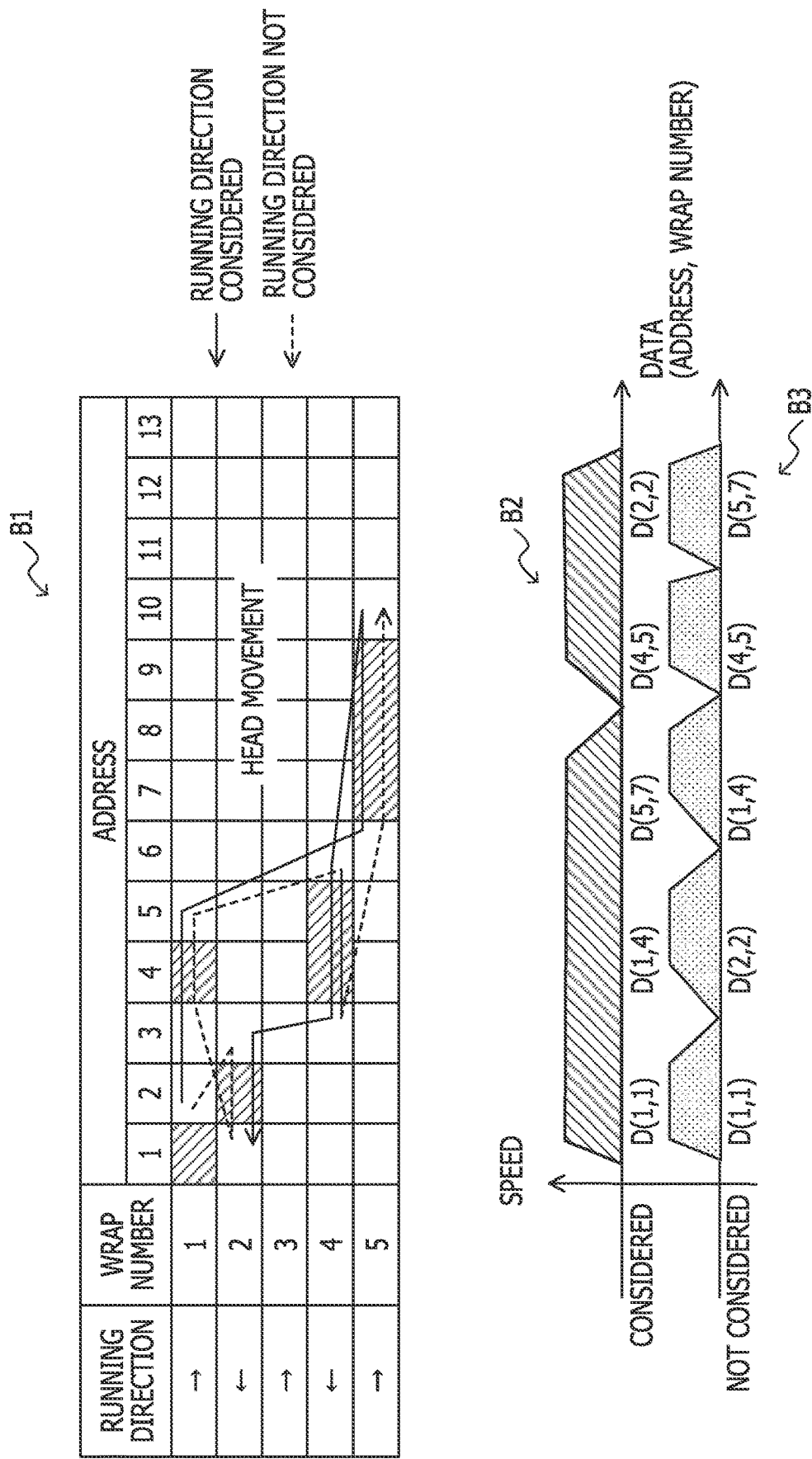
FIG. 2 exemplifies a movement direction and a movement speed of a head of a tape device in the case where a running direction is considered and in the case where the running direction is not considered.

FIG. 2 exemplifies a movement direction and a movement speed of a head of a tape device 3 (to be later described with reference to FIG. 3) in the case where the running direction is considered and in the case where the running direction is not considered. Here, the change of the head position relative to the tape due to the tape running is referred to as movement of the head.

It is assumed that, in the case where the position of a start point in tape is represented as (wrap number, address), pieces of data D (1, 1), D (1, 4), D (2, 2), D (4, 5), and D (5, 7) are read when the position of a head (not illustrated) is (1, 1).

In the example according to the embodiment, first, the piece of data D (1, 1) closest to the head position is selected.

Next, D (1, 4) the running direction of which is not changed from that of D (1, 1) and which is closest to the end point position (1, 2) of D (1, 1) is selected.

A running speed Vs from (1, 1) to (1, 4) is calculated by expression (1) below. An upper limit speed v is 5, and a number of reverse rises n is only one that is a rise of the head at (1, 1) because of the running in the same direction.

$$Vs((D(1,1),D(1,4)) = (\text{distance}(D(1,1),D(1,4)) + (\text{distance}(D(1,1),D(1,4) - 1/4*n))*v*1/2 = (3+3-1/4*1)*5*1/2 = 14.375 \quad (1).$$

Likewise, the running speeds Vs from (1, 4) to (5, 7), from (5, 7) to (4, 5), and from (4, 5) to (2, 2) are calculated by expressions (2) to (4) below.

$$Vs((D(1,4),D(5,7)) = (\text{distance}(D(1,4),D(5,7)) + (\text{distance}(D(1,4),D(5,7) - 1/4*n))*v*1/2 = (5+5-1/4*0)*5*1/2 = 25.000 \quad (2).$$

$$Vs((D(5,7),D(4,5)) = (\text{distance}(D(5,7),D(4,5)) + (\text{distance}(D(5,7),D(4,5) - 1/4*n))*v*1/2 = (2.236+2.236-1/4*2)*5*1/2 = 9.930 \quad (3).$$

$$Vs((D(4,5),D(2,2)) = (\text{distance}(D(4,5),D(2,2)) + (\text{distance}(D(4,5),D(2,2) - 1/4*n))*v*1/2 = (3.3606+3.3606-1/4*1)*5*1/2 = 17.403 \quad (4).$$

When the sum of the running speeds Vs in expressions (1) to (4) is calculated, 66.708 is obtained. This is the area of a graph denoted by a reference sign B2 in FIG. 2. Such a movement order of the head is a movement order in consideration of the running direction indicated by solid arrows in a graph denoted by a reference sign B1.

In contrast, when the running direction is different, running of the tape is reversed and is temporarily stopped to become zero. Thus, a quarter of an address is desired for each of rise and fall of the speed. Accordingly, when the upper limit speed v is 5, the running speed Vs from (1, 1) to (2, 2) is calculated by expression (5) below.

$$Vs((D(1,1),D(2,2)) = (\text{distance}(D(1,1),D(2,2)) + (\text{distance}(D(1,1),D(2,2) - 1/4*n))*v*1/2 = (1.414+1.414-1/4*2)*5*1/2 = 5.821 \quad (5).$$

Likewise, the running speeds Vs from (2, 2) to (1, 4), from (1, 4) to (4, 5), and from (4, 5) to (5, 7) are respectively calculated by expressions (6) to (8) below.

$$Vs((D(2,2),D(1,4)) = (\text{distance}(D(2,2),D(1,4)) + (\text{distance}(D(2,2),D(1,4) - 1/4*n))*v*1/2 = (2.236+2.236-1/4*2)*5*1/2 = 9.930 \quad (6).$$

$$Vs((D(1,4),D(4,5)) = (\text{distance}(D(1,4),D(4,5)) + (\text{distance}(D(1,4),D(4,5) - 1/4*n))*v*1/2 = (3.162+3.162-1/4*2)*5*1/2 = 14.561 \quad (7).$$

$$Vs((D(4,5),D(5,7)) = (\text{distance}(D(4,5),D(5,7)) + (\text{distance}(D(4,5),D(5,7) - 1/4*n))*v*1/2 = (2.236+2.236-1/4*2)*5*1/2 = 9.930 \quad (8).$$

When the sum of the running speeds Vs in expressions (5) to (8) is calculated, 40.243 is obtained. This is the area of a graph denoted by a reference sign B3 in FIG. 2. Such a movement order of the head is a movement order without consideration of the running direction indicated by dashed arrows in the graph denoted by the reference sign B1.

As has been described, the sum 66.708 of the running speeds Vs in the case where the running direction is considered is greater than the sum 40.243 of the running speeds Vs in the case where the running direction is not considered. Thus, in the case where the running direction is considered, the reading speed of the tape cartridge may be improved.

Figure 3:
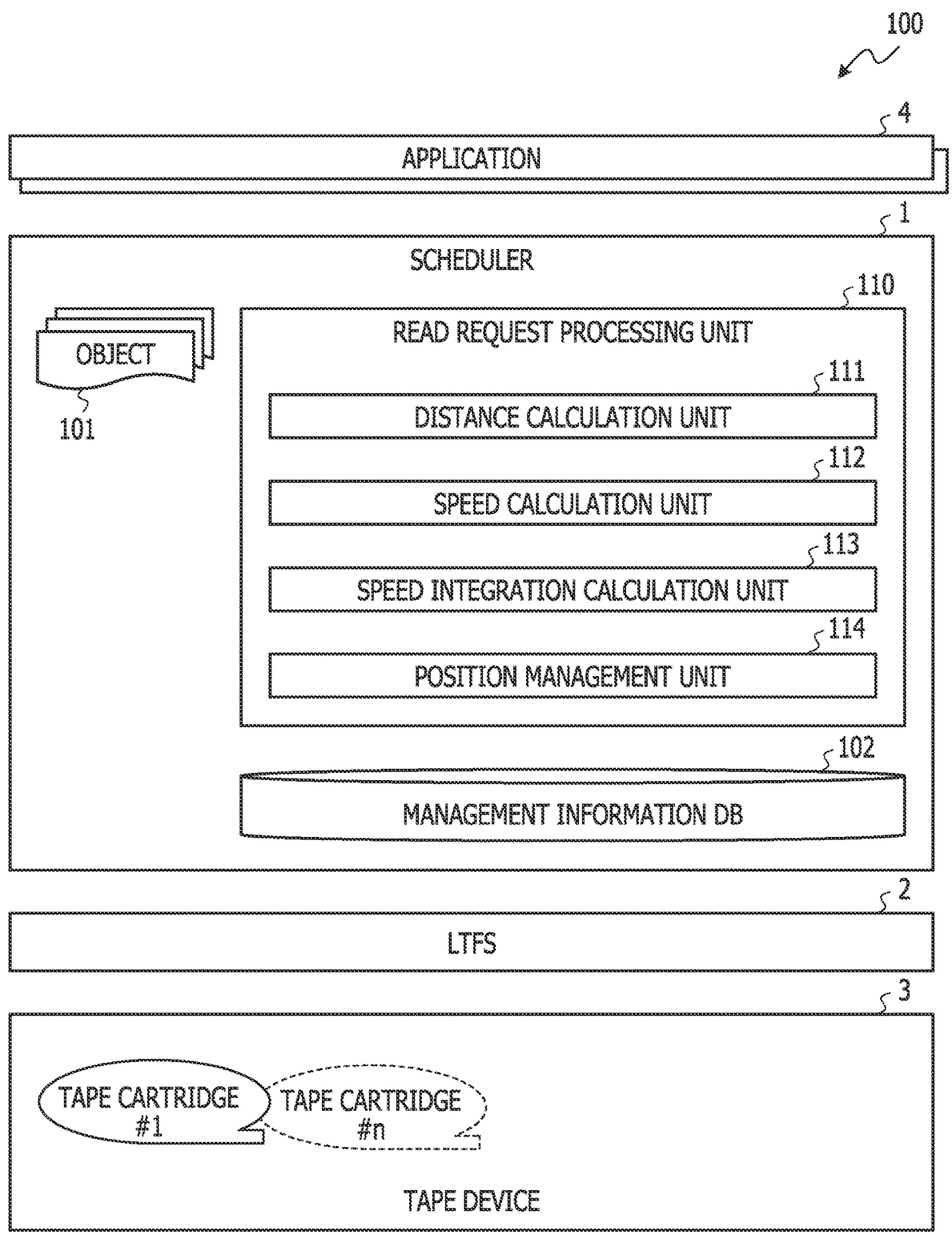
FIG. 3 is a block diagram illustrating a configuration example of a storage system according to an example of an embodiment.

FIG. 3 is a block diagram illustrating a configuration example of a storage system 100 in the example according to the embodiment.

The storage system 100 includes a scheduler 1, a linear tape file system (LTFS) 2, and a tape device 3 (for example, a tape storage).

An application 4 issues to the scheduler 1 requests for reading objects 101.

The scheduler 1 causes a read request processing unit 110 to determine a reading schedule (for example, a reading order) of the objects 101 based on a management information database (DB) 102.

The LTFS 2 has a function of causing the application 4 to recognize storing of the data such that the data is stored in folders for tape cartridges (tape cartridges #1, . . . , and #n in the example illustrated in FIG. 3) included in the tape device 3.

The management information DB 102 of the scheduler 1 stores information for managing the data on the tape in the tape cartridges and managing the running direction of the tape.

The read request processing unit 110 functions as a distance calculation unit 111, a speed calculation unit 112, a speed integration calculation unit 113, and a position management unit 114.

The distance calculation unit 111 calculates the distance between two objects 101.

The speed calculation unit 112 calculates the running speed of the tape when the head moves between two objects 101.

The speed integration calculation unit 113 calculates the sum of the running speeds of the tape between a plurality of pairs of the objects 101.

For example, the speed integration calculation unit 113 selects a reading order that maximizes the integrated speed calculated based on the distance and the running speed between the objects for requests for reading objects that exist in a plurality of wraps in different running directions. The running speeds may be calculated in consideration of deceleration caused by changes in running direction. The running speed may be a running speed from a first object that is an immediately preceding reading target to a second object that is preferentially selected as an object the running direction of which does not change from that of the first object and which is closest to the first object in distance. The integrated speed may be the sum of running speeds between a plurality of the first objects and the corresponding second objects.

The position management unit 114 refers to the management information DB 102 and manages the positions, in the tape, of the objects 101 that are the targets of the requests for reading.

Figure 4:
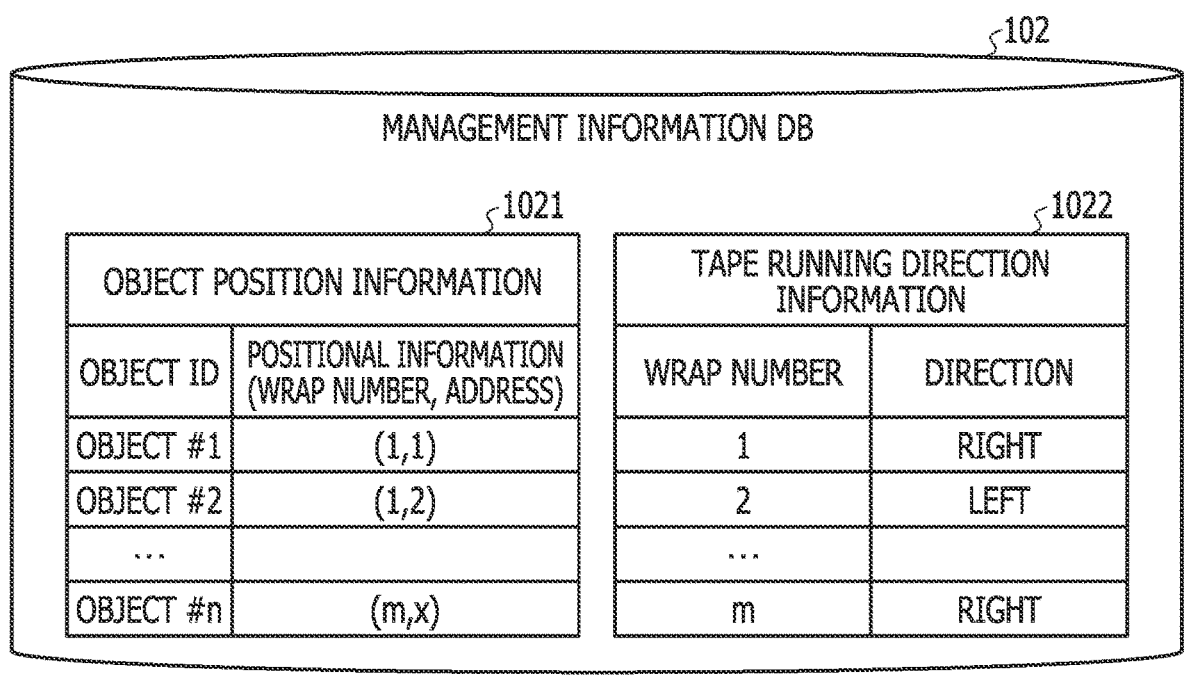
FIG. 4 illustrates a table indicating a structural example of a management information database (DB) illustrated in FIG. 3.

FIG. 4 illustrates a table indicating a structural example of the management information DB 102 illustrated in FIG. 3.

The management information DB 102 includes object position information 1021 and tape running direction information 1022.

In the object position information 1021, object IDs are associated with respective pieces of positional information indicated by (wrap number, address).

In the tape running direction information 1022, each of the wrap numbers is associated with a left or right running direction.

Figure 5:
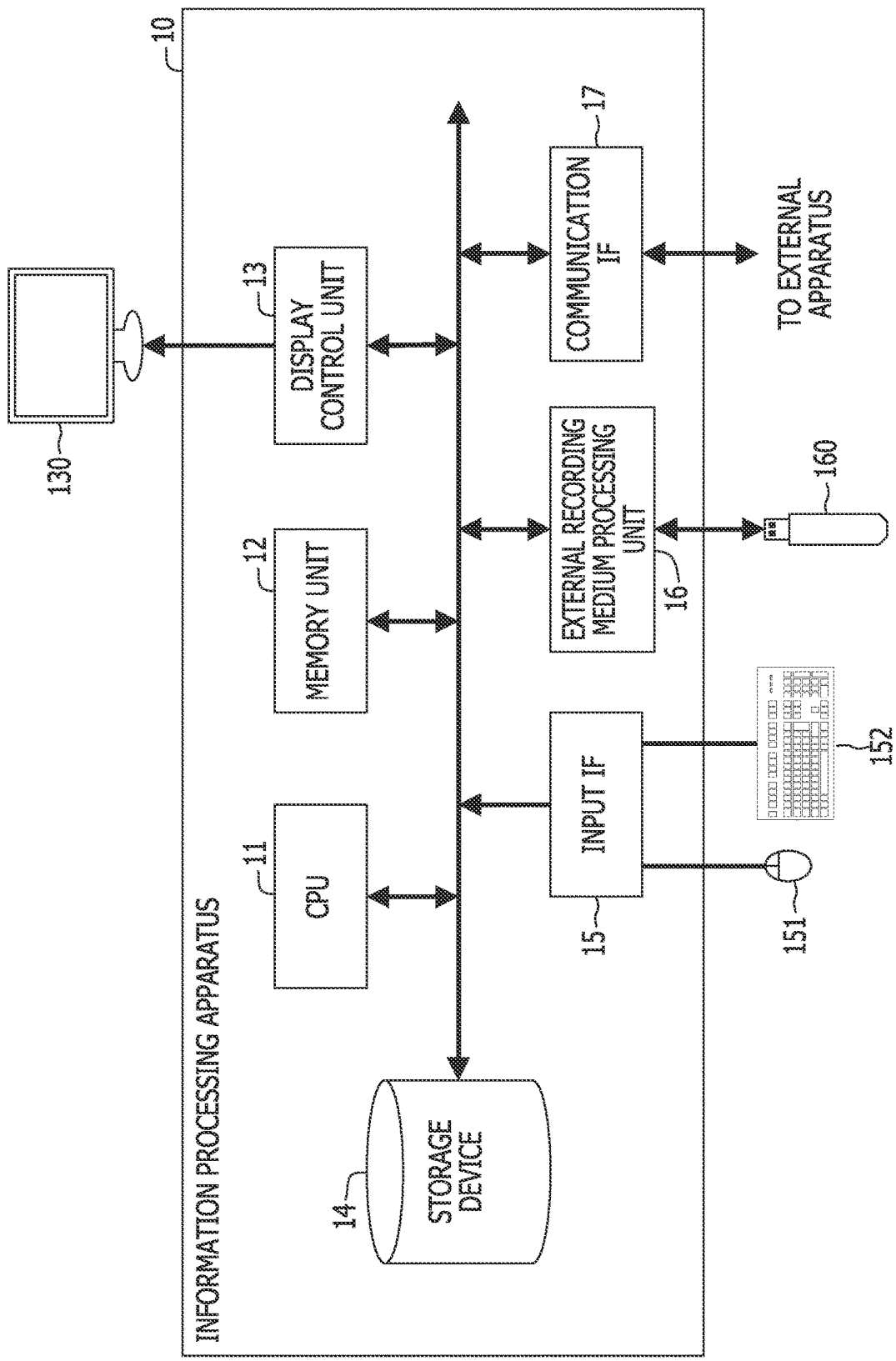
FIG. 5 is a block diagram illustrating a hardware configuration example of an information processing apparatus that corresponds to a scheduler and a linear tape file system (LTFS) illustrated in FIG. 3.

FIG. 5 is a block diagram illustrating a hardware configuration example of an information processing apparatus 10 that corresponds to the scheduler 1 and the LTFS 2 illustrated in FIG. 3.

As illustrated in FIG. 5, the information processing apparatus 10 includes a central processing unit (CPU) 11, a memory unit 12, a display control unit 13, a storage device 14, an input interface (IF) 15, an external recording medium processing unit 16, and a communication IF 17.

The memory unit 12 is an example of a storage unit and includes, for example, a read-only memory (ROM), a random-access memory (RAM), and so forth. Programs such as a Basic Input/Output System (BIOS) may be written in the ROM of the memory unit 12. The software programs written in the memory unit 12 may be appropriately loaded into and executed by the CPU 11. The RAM of the memory unit 12 may be used as a memory for temporary recording or as a working memory.

The display control unit 13 is coupled to a display device 130 and controls the display device 130. The display device 130 is a liquid crystal display, an organic light-emitting diode (OLED) display, a cathode ray tube (CRT), an electronic paper display, or the like and displays various types of information for, for example, an operator. The display device 130 may be combined with an input device. For example, the display device 130 may be a touch panel.

The storage device 14 is a storage device having high input/output performance. For example, a dynamic random-access memory (DRAM), a solid-state drive (SSD), a storage class memory (SCM), or a hard disk drive (HDD) may be used as the storage device 14.

The input IF 15 may be coupled to input devices such as a mouse 151 and a keyboard 152 and control the input devices. The mouse 151 and the keyboard 152 are examples of the input device. The operator performs various input operations by using these input devices.

The external recording medium processing unit 16 is configured so that a recording medium 160 is attachable to the external recording medium processing unit 16. The external recording medium processing unit 16 is configured to be able to read information recorded in the recording medium 160 in a state in which the recording medium 160 is attached to the external recording medium processing unit 16. In the present example, the recording medium 160 is portable. For example, the recording medium 160 is a flexible disk, an optical disk, a magnetic disk, a magneto-optical disk, a semiconductor memory, or the like.

The communication IF 17 is an interface that enables communication with an external apparatus.

The CPU 11 is a processing device that performs various types of control and various computations. The CPU 11 executes an operating system (OS) and the programs stored in the memory unit 12 to implement various functions.

The device that controls the operations of the entire information processing apparatus 10 is not limited to the CPU 11 and may be, for example, any one of a microprocessor unit (MPU), a digital signal processor (DSP), an application-specific integrated circuit (ASIC), a programmable logic device (PLD), and a field-programmable gate array (FPGA). The device that controls the operations of the entire information processing apparatus 10 may be a combination of two or more types of processors including the CPU, the MPU, the DSP, the ASIC, the PLD, and the FPGA.

[A-2] Example of Operation

Figure 6:
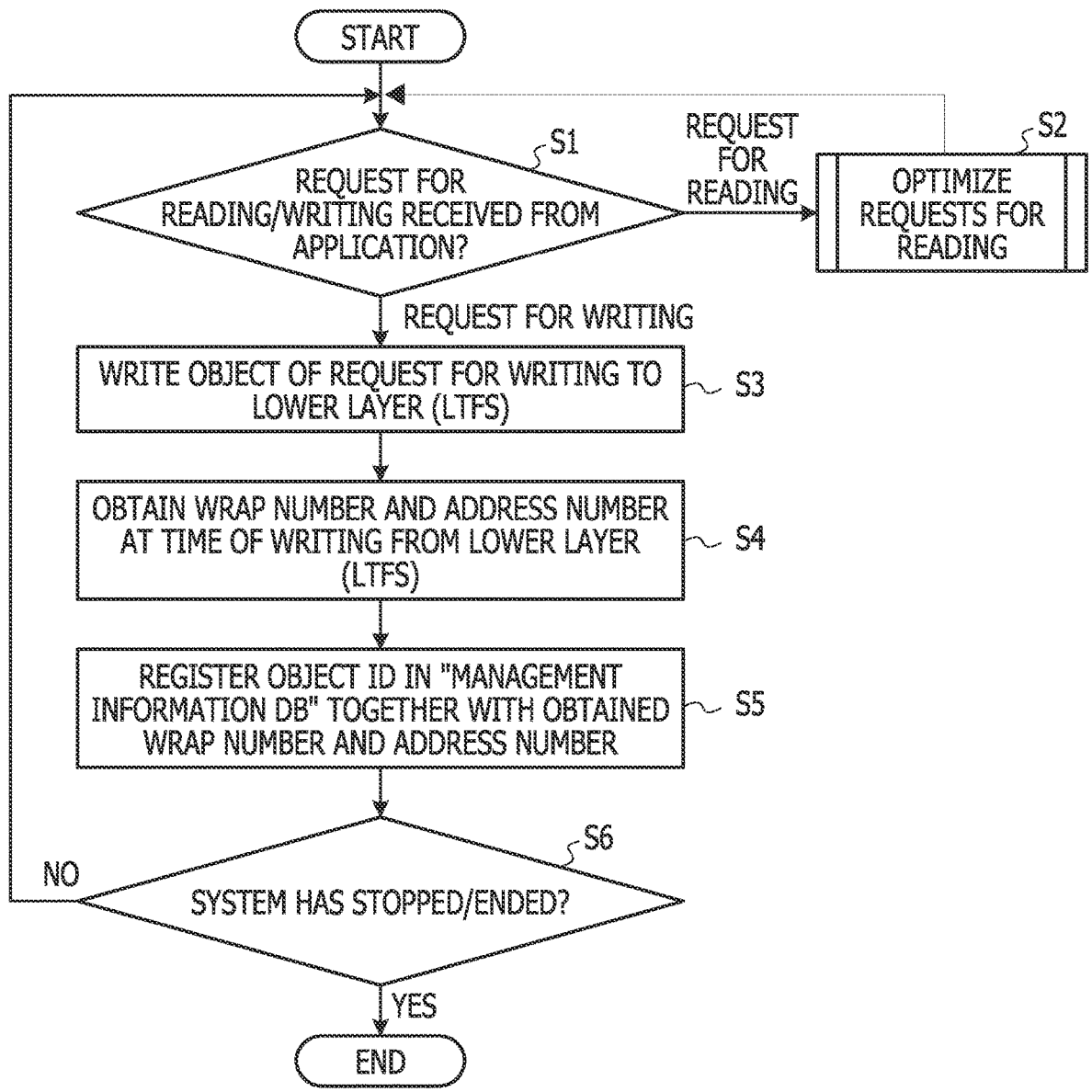
FIG. 6 is a flowchart explaining processing of reading from and writing to the tape cartridge according to the example of the embodiment.

Processing of reading from and writing to the tape cartridge according to the example of the embodiment will be described with reference to a flowchart (steps S1 to S6) illustrated in FIG. 6.

The scheduler 1 determines whether a request for reading or a request for writing is received from the application 4 (step S1).

When the request for reading is received ("request for reading" in step S1), the read request processing unit 110 performs an optimization process for requests for reading (step S2), and the processing returns to step S1. The details of the optimization process for requests for reading will be described later with reference to FIG. 7.

In contrast, when a request for writing is received ("request for writing" in step S1), the scheduler 1 writes the object 101 that is the target of the write request to LTFS 2 in a lower layer (step S3).

The scheduler 1 obtains the wrap number and the address number at the time of writing from LTFS 2 in the lower layer (step S4).

The scheduler 1 registers an object ID in the management information DB together with the obtained wrap number and address number (step S5).

The scheduler 1 determines whether the storage system 100 has stopped or ended (step S6).

When the storage system 100 has neither stopped nor ended (NO in step S6), the processing returns to step S1.

In contrast, when the storage system 100 has stopped or ended (YES in step S6), the processing of reading from and writing to the tape cartridge ends.

Next, the details of the optimization process for requests for reading illustrated in FIG. 6 will be described with reference to a flowchart (steps S21 to S28) illustrated in FIG. 7.

The distance calculation unit 111 obtains a plurality of accumulated requests for reading from a queue of requests for reading (step S21).

The distance calculation unit 111 selects a request for reading for data close to the current head position (step S22).

The position management unit 114 obtains an end address of the obtained data from the management information DB (step S23).

The distance calculation unit 111 selects requests for reading data in the forward direction and the opposite direction having start addresses close to the end address to generate new read routes to which the respective selected requests for reading are added and set the new read routes in a route candidate list (step S24).

When a plurality of pieces of data at the same distance exist, the distance calculation unit 111 generates new read routes to which respective requests for reading corresponding to the plurality of pieces of data are added (step S25).

The speed calculation unit 112 calculates the running speed between the pieces of data to be read, and the speed integration calculation unit 113 adds the running speed to the running speed in the same route to obtain an integrated speed (step S26).

The speed integration calculation unit 113 determines whether the integrated speed has been calculated with all the requests for reading (step S27).

When there is a request for reading with which the integrated speed has not been calculated (NO in step S27), the processing returns to step S24.

In contrast, when the integrated speed has been calculated with all the requests for reading (YES in step S27), the speed integration calculation unit 113 selects a route that maximizes the integrated speed from among all the routes in the route candidate list and executes the requests for reading in accordance with the selected route (step S28). Then, the optimization process for requests for reading ends.

Figure 7:
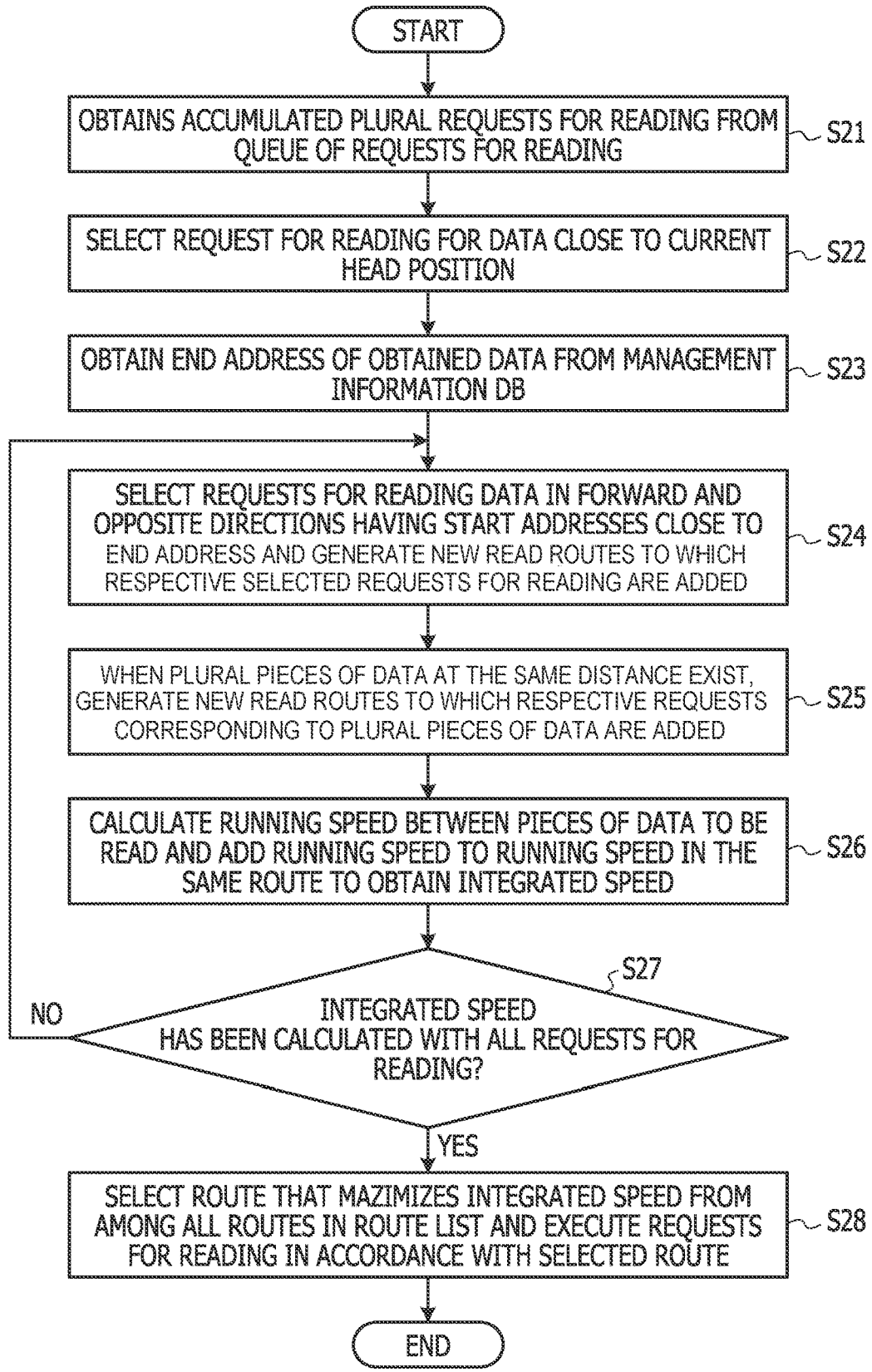
FIG. 7 is a flowchart explaining an optimization process for requests for reading illustrated in FIG. 6.
Figure 8:
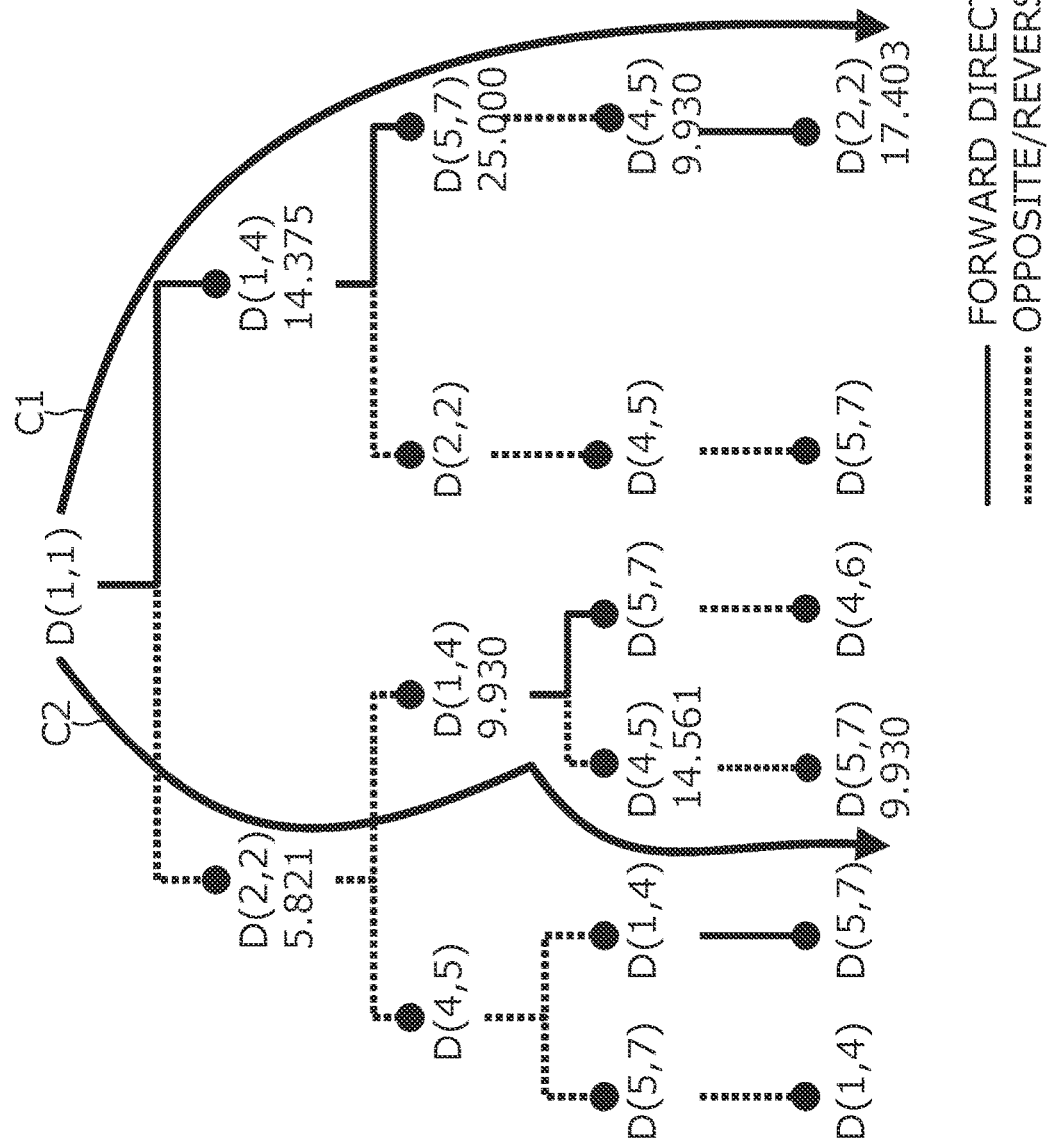
FIG. 8 is a diagram exemplifying a route candidate list generated by the optimization process for requests for reading illustrated in FIG. 7.

FIG. 8 is a diagram exemplifying the route candidate list generated by the optimization process for requests for reading illustrated in FIG. 7.

The running speed in the movement order in consideration of the running direction (see reference sign C1) illustrated in FIG. 2 and the running speed in the movement order without consideration of the running direction (see reference sign C2) illustrated in FIG. 2 are indicated as the running speed. In the route candidate list, solid line segments represent movement of the head in the forward direction, and dotted line segments represent the movement of the head in the opposite direction (for example, the reverse direction).

[A-3] Effects

With the scheduler 1, a program, and a method of processing information in the example according to the above-described embodiment, for example, the following operational effects may be obtained.

The scheduler 1 selects a reading order that maximizes the integrated speed calculated based on the distance and the running speed between the objects for requests for reading objects that exist in a plurality of wraps in different running directions. This may improve the reading performance of the tape storage. For example, compared to a method of optimizing requests for reading based only on the physical address position, the requests for reading may be further optimized, and high reading performance may be obtained.

The running speed is calculated in consideration of the deceleration caused by changes in running direction. This may reduce the number of changes in running direction and improve the reading speed.

The running speed is a running speed from the first object that is an immediately preceding reading target to a second object that is preferentially selected as an object, the running direction of which does not change from that of the first object and which is closest to the first object in distance. This may enable efficient search for a candidate for the next reading target object.

The integrated speed is the sum of running speeds between the plurality of first objects and the corresponding second objects. Thus, the integrated speed may be efficiently calculated for the route candidates in each of the reading orders.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising:
a memory; and
a processor coupled to the memory and the processor configured to:
obtain requests for reading objects that exist in a plurality of wraps in different running directions on a tape of a tape storage;

calculate an integrated speed for each of a plurality of orders of reading the objects based on a distance between the objects and a running speed of the tape between the objects; and select, from among the plurality of orders, an order that maximizes the integrated speed.

2. The information processing apparatus according to claim 1, wherein the running speed is calculated in consideration of deceleration caused by a change in a running direction.

3. The information processing apparatus according to claim 1, wherein the running speed is a speed of the tape that runs from a first object that is an immediately preceding reading target to a preferentially selected second object, running directions of the first object and the second object being same, the second object being closest to the first object in distance.

4. The information processing apparatus according to claim 1, wherein, the integrated speed is a sum of running speeds between the objects adjacent in a relevant order.

5. A non-transitory computer-readable recording medium having stored therein a program that causes a computer to execute a process, the process comprising:

obtaining requests for reading objects that exist in a plurality of wraps in different running directions on a tape of a tape storage;

calculating an integrated speed for each of a plurality of orders of reading the objects based on a distance between the objects and a running speed of the tape between the objects; and selecting, from among the plurality of orders, an order that maximizes the integrated speed.

6. The non-transitory computer-readable recording medium according to claim 5, wherein the running speed is calculated in consideration of deceleration caused by a change in a running direction.

7. The non-transitory computer-readable recording medium according to claim 5 wherein the running speed is a speed of the tape that runs from a first object that is an immediately preceding reading target to a preferentially selected second object, running directions of the first object and the second object being same, the second object being closest to the first object in distance.

8. The non-transitory computer-readable recording medium according to claim 5, wherein, the integrated speed is a sum of running speeds between the objects adjacent in a relevant order.

9. An information processing method, comprising:

obtaining, by a computer, requests for reading objects that exist in a plurality of wraps in different running directions on a tape of a tape storage;

calculating an integrated speed for each of a plurality of orders of reading the objects based on a distance between the objects and a running speed of the tape between the objects; and selecting, from among the plurality of orders, an order that maximizes the integrated speed.

10. The information processing method according to claim 9, wherein the running speed is calculated in consideration of deceleration caused by a change in a running direction.

11. The information processing method according to claim 9 wherein the running speed is a speed of the tape that runs from a first object that is an immediately preceding reading target to a preferentially selected second object, running directions of the first object and the second object being same, the second object being closest to the first object in distance.

12. The information processing method according to claim 9, wherein, the integrated speed is a sum of running speeds between the objects adjacent in a relevant order.

\* \* \* \* \*